C. L. KENNICOTT AND C. P. KEMBLE.
MACHINE FOR FORMING METAL.
APPLICATION FILED AUG. 13, 1918.

1,352,813.

Patented Sept. 14, 1920.
7 SHEETS—SHEET 1.

Fig. 1

Inventors:
Cass L. Kennicott and
Charles P. Kemble,
By Dyrenforth, Lee, Chritton and Wiles,
Attys.

C. L. KENNICOTT AND C. P. KEMBLE.
MACHINE FOR FORMING METAL.
APPLICATION FILED AUG. 13, 1918.

1,352,813.

Patented Sept. 14, 1920.

Inventors:
Cass L. Kennicott
Charles P. Kemble,
By Dyrenforth, Lee, Chritton and Wiles,
Attys.

C. L. KENNICOTT AND C. P. KEMBLE.
MACHINE FOR FORMING METAL.
APPLICATION FILED AUG. 13, 1918.

1,352,813.

Patented Sept. 14, 1920.
7 SHEETS—SHEET 5.

Inventors:
Cass L. Kennicott
Charles P. Kemble
By Dyrenforth, Lee, Chritton and Wiles,
Attys.

UNITED STATES PATENT OFFICE.

CASS L. KENNICOTT AND CHARLES P. KEMBLE, OF CHICAGO HEIGHTS, ILLINOIS; SAID KENNICOTT ASSIGNOR, BY MESNE ASSIGNMENTS, OF HIS ENTIRE RIGHT TO ABNER C. HARDING, OF CHICAGO, ILLINOIS.

MACHINE FOR FORMING METAL.

1,352,813.     Specification of Letters Patent.     Patented Sept. 14, 1920.

Application filed August 13, 1918. Serial No. 249,641.

*To all whom it may concern:*

Be it known that we, CASS L. KENNICOTT and CHARLES P. KEMBLE, citizens of the United States, residing at Chicago Heights, in the county of Cook and State of Illinois, have invented a new and useful Improvement in Machines for Forming Metal, of which the following is a specification.

Our invention relates to certain new and useful improvements in machines for forming metal. It is the object of our invention to provide a metal-forming machine of such construction as to be capable of producing efficiently by a rolling process those types of formed metal articles which have hitherto been produced almost exclusively by presses and drop-hammers of various descriptions.

Among the many advantages of our invention, the following may be enumerated: It is possible to produce by the use of our machines in a single operation a formed metal article which would require for its production either an exceedingly large and costly apparatus of the press or hammer type, or a plurality of operations by any such machine of reasonable size and cost; the forming rolls of our machine may be of such design as to permit of varying the character of the work produced by the machine at an expense much less than that necessary for altering dies, hammers or similar forming members made use of in the press type of machine. In certain classes of work for which it is best adapted, such, for instance, as the production of heavy plate-metal formed articles, the labor cost in operating our machine is materially less than in operating the press or hammer type of machine, and the production or output is substantially greater for plants of the same initial cost.

A machine embodying our invention is illustrated in the accompanying drawings, and from these drawings in connection with the following detailed description of the machine illustrated thereby, it will be seen that we have effected many improvements applicable to metal rolling machines in general and of particular service in combination with a machine of the characteristics briefly pointed out above.

In the accompanying drawings.

Referring more particularly to the drawings, the numeral 15 (Fig. 1) designates the floor or foundation upon which our machine is to be mounted, this foundation being preferably formed with a pit 16 in which are mounted supporting ways 17 arranged longitudinally of the pit 16 and carrying the end frames 18 and 19. As shown, these frames are of generally triangular form and provided at their bases with supporting feet which slide upon and are secured to the upper surfaces of the supporting ways 17.

Figure 1:
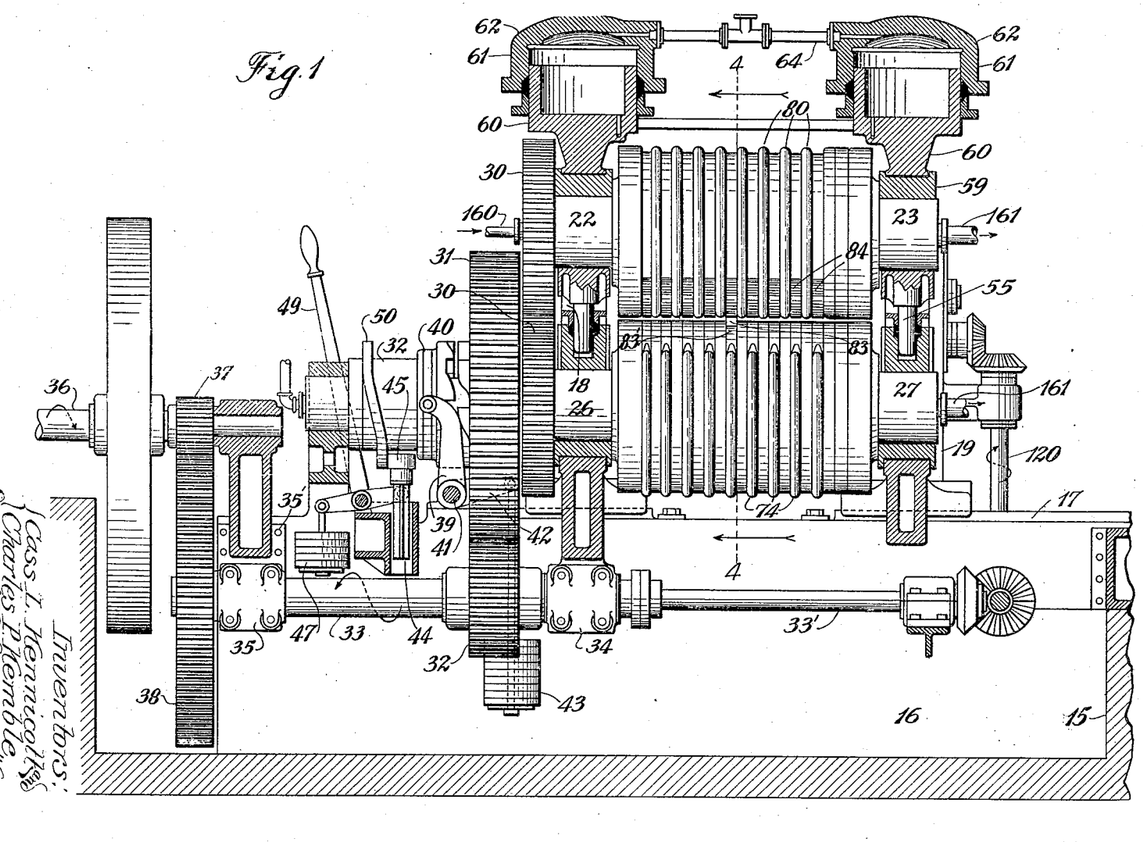
Figure 1 is an enlarged longitudinal vertical section of a machine embodying our invention, the forming rolls and certain other parts being shown in elevation and parts being broken away.
Figure 2:
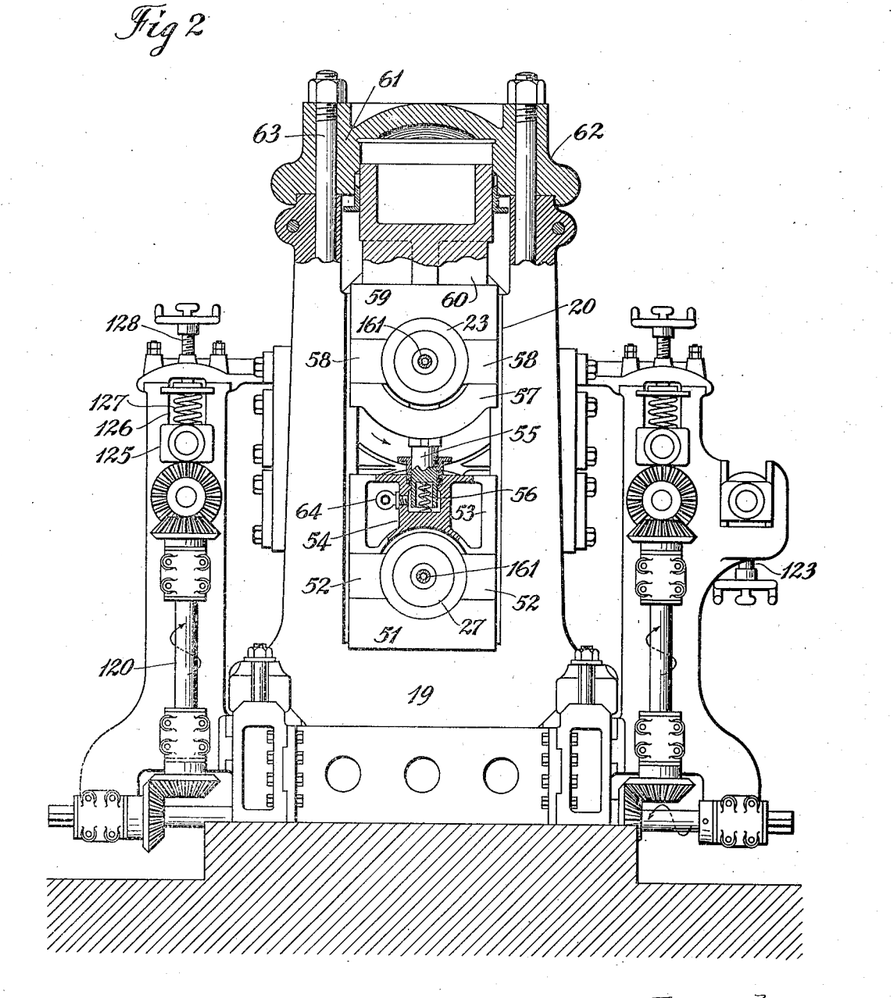
Fig. 2 is an end elevation, partly in section.
Figure 3:
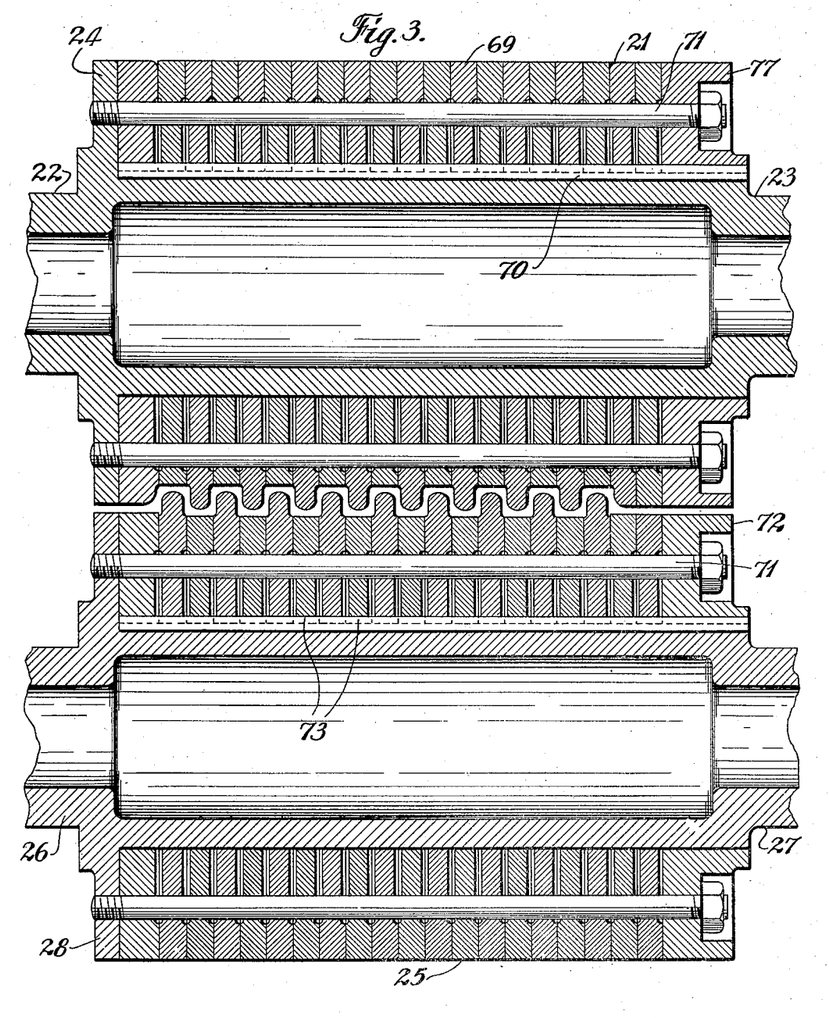
Fig. 3 is an enlarged longitudinal section through the forming rolls.

Referring to the enlarged view, Fig. 2, it will be seen that the frames are slotted vertically, as at 20, to receive the journals, or pillow-blocks, of the forming-rolls. As shown in Fig. 3, each forming-roll comprises a hollow shaft member having sleeved thereon the forming elements. The upper roll, designated by 21, has reduced ends 22 and 23 which serve as journals, the end 22 being further provided with an integral flange 24. The lower roll 25 is provided with similar reduced ends 26, 27 and with a flange 28. Passing for the moment the construction of the forming surfaces of the rolls 21, 25, it will be seen by reference to Figs. 1 and 3 that the rolls are mounted in spaced parallel relation within the slots of the end frames and are geared together by a pair of meshing spur gears 30, keyed or otherwise fastened upon the reduced shaft-ends 22, 26. This latter shaft-end is extended considerably beyond its journal portion for the mounting of the driving gear 31 and a clutch member 32 which is splined upon the shaft-end and provided with suitable clutch jaws adapted for engagement with similar jaws in the driving gear 31, which it will be noted is freely revoluble upon the shaft. The gear 31 is driven from a pinion 32 carried by a countershaft 33 which lies within the pit 16 and below the machine and may have its end carried by a journal 34 hung from the end frame 18 (see Fig. 1). The opposite end of the countershaft may be journaled in a box 35 supported from a cross member 35¹ joining the ways 17. The driving-shaft 36, operable from some suitable power source not shown, drives the countershaft 33 through the pinion and gear 37, 38.

For the purpose of rendering the operation of our machine more certain and easy of control we prefer that the clutch member 32 should be of the well-known automatic throw-out type so as to provide a single revolution of the rolls 21, 25 at each operation of the clutch-controlling lever. In Fig. 1 we have shown a simple and well-known type of automatic throw-out clutch, the splined clutch element 32 being normally urged toward the engaging position by a yoke 39 which embraces the clutch member and is suitably pinned to a collar 40 therein, the yoke being mounted on a rock-shaft 41 which carries an arm 42 on which a weight 43 is hung. The clutch member 32 is held out of engagement by a plunger 44 having a roller 45 which engages a spiral rib 50 on the clutch member. The plunger is held against the clutch member by a weight 47 and may be manually withdrawn from engagement with the clutch by a hand-controlled lever 49. The spiral rib 50 formed on the clutch member serves to hold the plunger 44 out of engagement therewith when it has once been depressed until the clutch has made one complete revolution. The detailed construction and operation of such clutches is well understood in the art and therefore requires no specific description.

Referred again to Fig. 2, it will be seen that the rolls 21, 25 are journaled in pillow-blocks which are slidably mounted within the slots 20 of the end frames. The lower roll 25 has its shaft portion 27 supported by a lower block 51, intermediate blocks 52 and an upper block 53. This latter member carries a part 54 which forms a cylinder for a hydraulic plunger 55 suitably packed where it enters the cylinder, as by the packing gland shown and normally held in elevated position by a coiled spring 56 which seats within a bore in the lower end of the plunger 55. The plunger 55 carries at its upper end a bearing block or pillow-block 57 which supports bearing blocks 58, 59 for the shaft-end 23. The upper bearing block 59 carries a plunger 60 which operates within a cylinder 61 formed in a top casting 62 which is bolted to the end frame 18 by the tie-rods 63, as shown by the drawings. Cylinders 54 and 61 may be supplied with fluid under pressure, as from a hydraulic accumulator, by means of the inlet pipes 64 leading thereto. The supply of fluid to these pipes may be controlled by suitable manual valves, not shown, and by manipulating such valves the fluid may be exhausted from the lower small cylinder 54 and admitted to the upper large cylinder 61 for the purpose of exerting a heavy downward pressure upon the upper roll 21, or if for any reason it be desired to raise this upper roll, fluid may be exhausted from the upper cylinder 61 and admitted to the lower cylinder 54, which will cause the plunger 55 to be forced upwardly, thereby lifting the journals 57, 58, 59 and bodily raising the upper roll 21. This construction, by which the upper roll may be yieldingly held by hydraulic pressure against the lower roll or may be lifted therefrom at will, we regard as one of the most important structural advantages of our machine. It will be understood that the end frame member 19 in which the roll ends 22, 26 are journaled is provided with similar vertically slidable journals for the upper roll and hydraulic cylinders for moving the journals.

In Figs. 8 to 13 we have illustrated in plan view and in longitudinal section three examples of metal articles which may readily be formed by our machine. For the purpose of illustrating the action of our machine we will now describe the specific construction of the rolls required to produce formed metal in the shapes illustrated by these figures of the drawings, and from this description it will be apparent to those skilled in the art how the machine may be adapted for service in producing various other types of formed metal articles. The article illustrated in Figs. 8 and 11, which show, respectively, a longitudinal section and a top plan view, is a relatively heavy corrugated plate of the type used for car-ends and the like. As shown, it consists of a body portion 65 of relatively heavy steel plate provided in its central portion with longitudinal corrugations 66 which, as shown, terminate some distance short of each end of the plate to leave blank margins 67 at the ends. It will further be noted that the corrugations 66 are coned or tapered at their ends, as shown at 68. For the purpose of producing a corrugated plate of the form illustrated in Figs. 8 and 11 we provide forming rolls of the laminated construction shown in Figs. 3 and 14, each roll comprising a plurality of perforated disks or annuli generally designated by the numeral 69, each annulus having a central bore of the proper size to permit it to be sleeved upon the rolls 21, 25, and being further provided with a key-way which in the proper position of the annulus registers with a similar longitudinal keyway running the whole length of the roll and adapted to receive a key 70. For the purpose of better securing these annular sections to one another and to the roll we may provide a plurality of tie-rods 71 which have their ends passing through bores in detachable end flanges or annuli 72 and are threaded at their opposite ends into the flanges 24, 28 of the rolls 21, 25, respectively.

Figure 5:
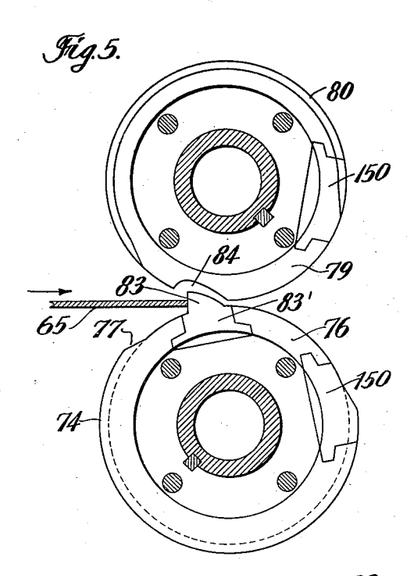
Figs. 5, 6 and 7 are transverse sections through three pairs of forming rolls of various designs and adapted for turning out different classes of work.
Figure 14:
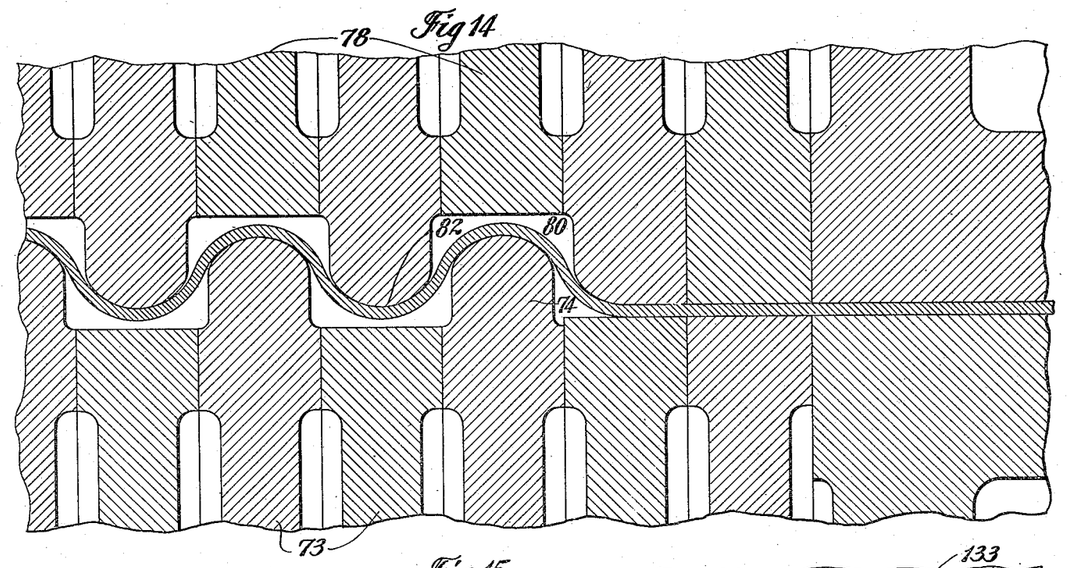
Fig. 14 is an enlarged detail section through the forming rolls, showing a plate therein.
Figure 15:
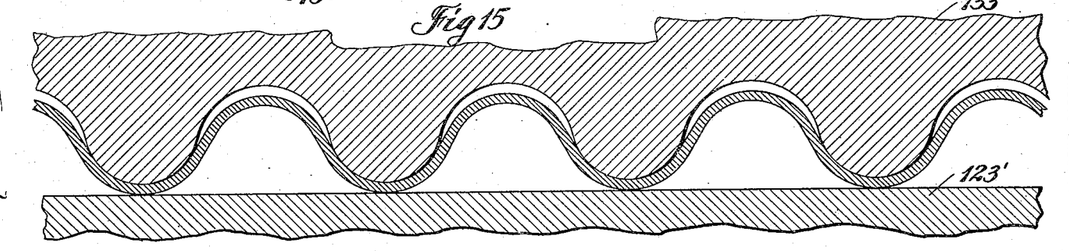
Fig. 15 is a section through the rear feed rolls, taken on the line 15 of Fig. 4.

Referring more particularly to the annular sections 69 which make up the forming surfaces of the rolls, it will be seen from Figs. 3 and 14 that each alternate section, designated 73, of the lower roll 25 extends beyond the cylindrical surface, as indicated at 74, this extended portion having a semi-circular end where it is desired to produce corrugations such as the corrugations 66 which are generally semi-circular in cross-section. In Fig. 5, the cylindrical forming surface of the roll is designated by the numeral 76 and it will be seen from this figure that the extended portions 74 of the alternate sections of the roll extend around approximately two-thirds of the circumference of the roll and are tapered at the ends, as shown at 77. In order to accommodate these projecting roll sections 74 on the lower roll 25 the alternate sections 78 of the upper roll 21 which lie opposite to the extending portions 74 are cut away below the cylindrical surface 79 of this roll to provide grooves or recesses 80. That portion of each of the alternate sections 81 of the upper roll which lies adjacent to groove 80 has a rounded or semi-cylindrical end 82, as shown in Fig. 14 of the drawings. It will be understood that the grooved portions 80 of the upper roll sections 78 are of the same peripheral length as the extended portion 74 of the lower roll section 73, as shown in Fig. 5, so that as the two rolls are revolved through their meshing gears 30 the projecting portion 74 of the lower roll-section will enter and roll within the groove 80 of the upper roll. It will be noted that the ends of each roll have continuous cylindrical surfaces provided by the stationary flanges 24, 28 and the removable end sections or flanges 72 and the roll-sections adjacent these two end portions. These cylindrical end sections of each roll are flush with the cylindrical surfaces 76, 79 of the two rolls, so that considered as a whole and with the exception of the grooves 80 and projections 74 the rolls may be regarded as cylindrical elements throughout their length.

One of the roll sections of the lower roll 25, preferably a section near the middle of the roll, is provided on its cylindrical portion 76 with an inset plug 83¹ carrying a projection 83, as shown in Fig. 5, and the cylindrical surface 79 of the upper roll 21 is provided with a mating recess 84.

Referring now to Fig. 5, it will be seen that in operating the machine the rolls may be stopped at the position shown in this figure of the drawing and a plate, such as the plate 65, may then be held in position with its forward end abutting against the front face of the projection 83. If now the rolls be driven in the direction indicated by the arrows thereon and simultaneously the plate 65 be pushed forward, the plate will be gripped between the cylindrical surfaces 76, 79 as it approaches the contact point of the two rolls in the direction indicated by the arrow. As the rolls revolve the projections 74 on the lower roll sections will come in contact with the lower face of the plate and bend or press it upwardly into the grooves 80 of the upper roll, thereby forming the longitudinal corrugations 66. At all times the marginal edges of the plate designated 85 on Fig. 11 of the drawing will be gripped firmly and prevented from bending by the ends of the roll. The length of the corrugations 66 will obviously be dependent upon the peripheral length of the projection 74 and of its mating groove 80. When the rolls have revolved so far as to reach the ends of the projection and groove the mating cylindrical surfaces 76, 79 will again come into contact with the lower and upper faces of the plate, respectively, and will effectively straighten and remove any crimps from the rear marginal edge 67 of the plate. It will also be understood that the length of the front marginal edge 67 of the plate will be determined by the position of the stop lug or projection 83 with reference to the end of the forming projection 77 as measured along the peripheral surface of the roller.

Figure 6:
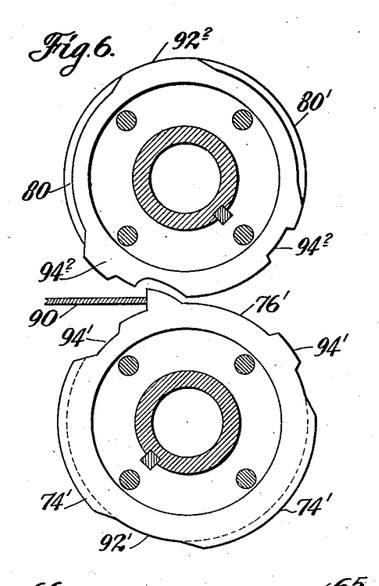
Figures 8, 9, 10:
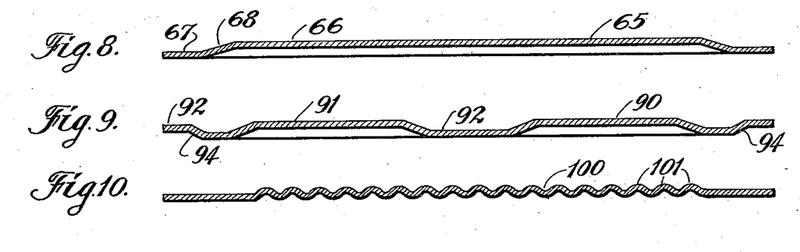
Figs. 8, 9 and 10 are longitudinal sections through formed plates as produced respectively by the operation of the rolls of Figs. 5, 6 and 7.
Figure 11:
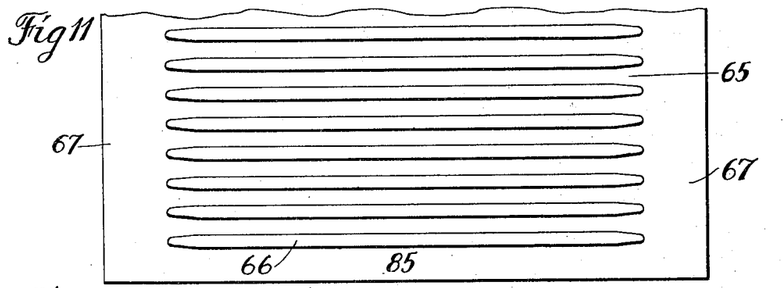
Figs. 11, 12 and 13 are plan views of the plates illustrated in Figs. 8, 9 and 10, respectively.
Figure 12:
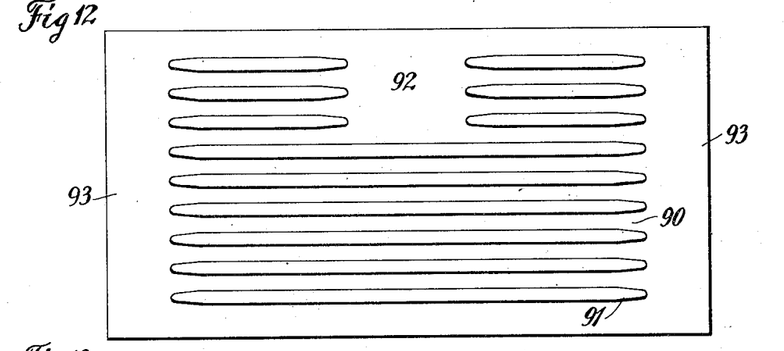

In Fig. 6 we have shown, in cross-section, a pair of rolls adapted to produce a plate corrugated in the manner shown in Figs. 9 and 12. This plate, designated generally by 90, is provided with longitudinal corrugations 91 similar to the corrugations 66 of the plate shown in Figs. 8 and 11, but on a portion of its surface the corrugations 91 are interrupted intermediate their lengths to provide a plain surface 92, as shown in Fig. 12. By reference to Fig. 9, it will also be seen that the front and rear margins 93 of the plate 90 are bent upward or crimped, as shown at 94, to lie above the plain surface of the plate. This form of plate may be produced by rolls having forming annuli of the design shown in Fig. 6. In general the construction of the sections of these rolls is the same as that of the sections of the rolls shown in Fig. 5, with the exception that the forming projections 74¹ of the lower roll 25 are interrupted as at 92¹ and the grooves 80¹ are interrupted as at 92² on certain of the annuli lying adjacent one end of the rolls in order to provide the interrupted corrugations which leave the plain surface 92 on the plate. To form the offsets, or bends, 94 in the ends 93 of the plate, each of the sections of the lower roll 25 is formed with a recess 94¹ in its cylindrical surface 76¹ and each of the sections of the upper roll 21 is provided with a mating projection 94² adapted to mesh with and force the material of the plate into the recess 94¹. The projection 94² and the recess 94¹ produce the offset 94 at the front end of the plate 90. To produce a similar offset 94 at the rear end of the plate the cylindrical surface 76¹ is provided with a projection 94 and the cylindrical surface 79¹ is provided with a mating recess 94². It is thought that the manner of operation of the rolls illustrated in Fig. 6 in producing the formed plates shown in Figs. 9 and 12 will be clear from the foregoing description.

Figure 7:
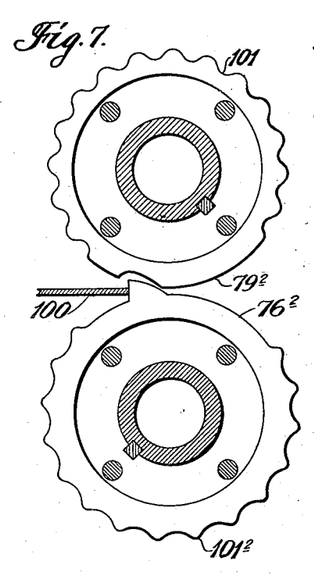
Figure 13:
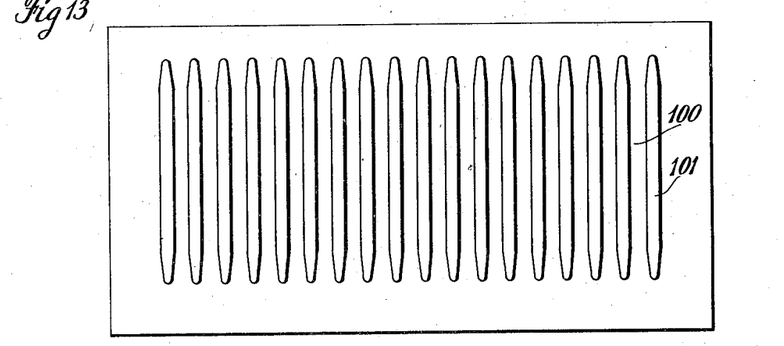

In Figs. 10 and 13 we have shown a third form of plate, designated 100. This plate is provided with corrugations 101 of a form similar to the corrugations 66 and 91 but arranged transversely of the plate. In order to produce this form of plate we make use of forming rolls of the design shown in Fig. 7. On these rolls the sections of the upper roll 21 will be provided with scallops 101¹ cut below the cylindrical surface 79² of the roll, while the sections of the lower roll 25 will be provided with teeth or scallops 101² extending above the cylindrical surface 76² of this roll. It is thought that the manner of operation of the rolls shown in Fig. 7 in producing the form of plate shown in Figs. 10 and 13 will be apparent without further description.

Figure 4:
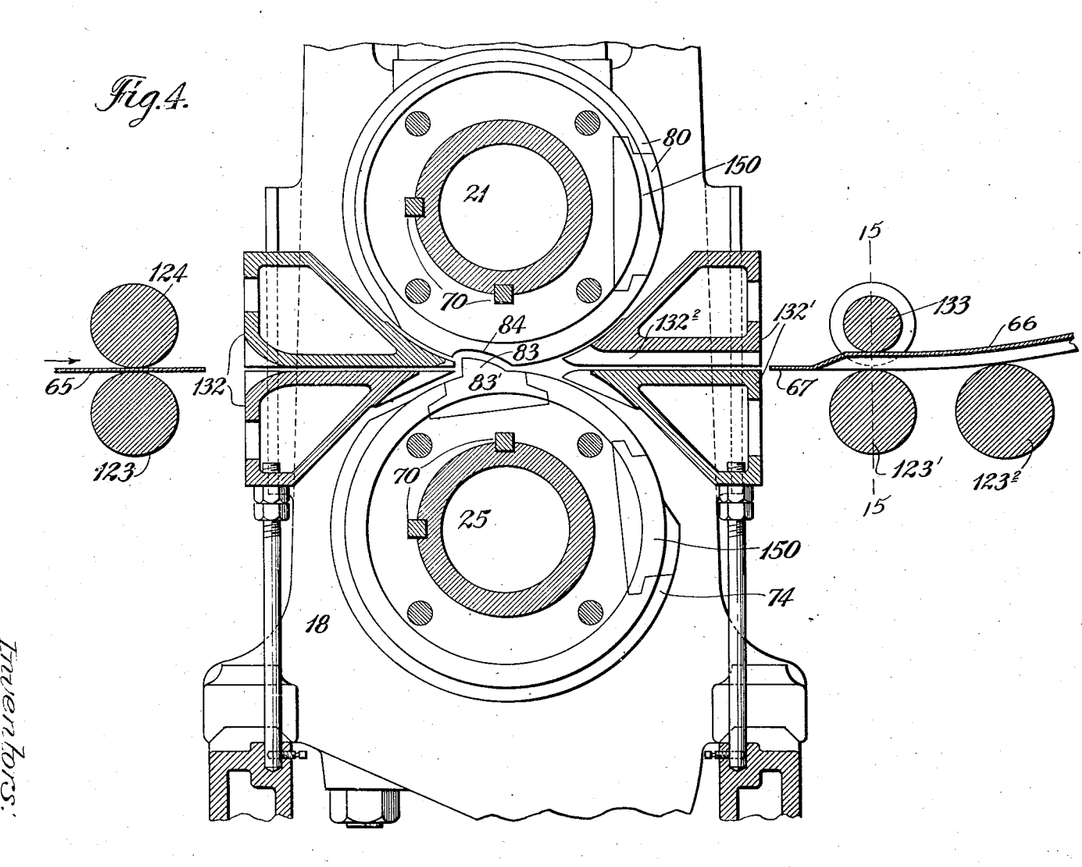
Fig. 4 is an enlarged longitudinal section on the line 4—4 of Fig. 1.

In order to feed the work to the forming rolls 21, 25 and to receive it as it passes between these rolls, we have provided the feeding rolls shown in Figs. 2 and 4. Journaled between the frames 18, 19, with its upper surface in the plane of the opening between the forming rolls is a constantly driven feeding roll 123, the driving means for which consists of a vertical shaft 120 driven by bevel gears from an extension 33¹ of the shaft 33. In order to exert pressure upon the work and hold it in contact with the constantly driven feed roll 123 we provide a pressure roll 124 which is carried in a journal 125 which slides in slots 126 of the frame. A spring 127 which may be adjusted by a screw 128 causes the roll 124 to normally bear downward against the roll 123. Between the feed roll 123 and pressure roll 124 and the forming rolls of the machine we prefer to mount stationary guide members 132, which are spaced apart to receive and guide the work as it enters between the forming rolls. At the other side of the forming rolls a second pair of stationary guide members, 132¹, is mounted to receive the work as it issues from the rolls. It will be understood that the guide members 132, 132¹, must be of such form as to handle the particular class of work for which the machine is being used. For instance, in rolling plate metal into the forms illustrated by Figs. 8 to 13, the guides 132 will extend entirely across the machine to receive and guide a flat plate, while the guides 132¹ will be properly formed to receive and guide the formed plate. Thus, if a plate having longitudinal corrugations, such as shown in Fig. 11, is to be guided, the upper guide member 132¹ must have transverse grooves such as shown at 132² to receive the corrugations 66. Behind the guides 132¹ there is a second constantly running roll 123¹ which withdraws the work from the forming rolls. The roll 123¹ may be driven by suitable gear connections, and through the horizontal shaft 130 and the vertical shaft 131, from the shaft 33¹. Due to the fact that the upper surface of the plate will have been thrown out of the plane of the plate by the operation of the forming rollers, it is undesirable to use a cylindrical pressure roll of the full width of the machine in connection with the feed roll 123¹. We prefer to make use of a grooved roll, designated 133, the grooves of which receive the corrugations of the plate. The pressure roll 133 may be mounted similarly to the roll 124. Behind the feed roll 123¹ we prefer to mount a de-cambering or straightening roll 123², the journals of which are slidable vertically in the frame and may be fixed in any position by screws 123₁. As shown in Fig. 4 the roll serves to bend the plate upwardly to overcome any curvature in the opposite direction which the forming rolls may have imparted to it, and which the rear guides 132¹ failed to remove.

The operation of our machine as a whole is as follows:

The main driving shaft 36 will be constantly driven from some suitable power source and the feed rolls 123, and 123¹ will also be constantly driven at the same peripheral speed as the forming rolls. The metal blank which is to be formed, for instance the plate 65 shown in Figs. 8 and 11, will be placed between the feed roll 123 and pressure roll 124. Assuming that the forming rolls are stopped in the position shown in Fig. 2, when the end of the plate has passed beneath the pressure roll, the latter, operating in the proper direction, will feed the plate through the stationary guides 132 until the end of the plate contacts with the vertical face of the projection 83, as shown in Fig. 5 of the drawings. Further movement of the plate being arrested by this projection, the feed rolls 123, will continue to revolve, slipping on the surface of the plate, the pressure exerted by the pressure roll 124 being insufficient to overcome the resistance to motion of the comparatively heavy forming rolls 21, 25. If the clutch lever 49 be now operated the clutch 32 will engage the driving gear 31 and the forming rolls 21, 25 will start to revolve. The feed roll 123 will immediately force the plate forward between the rolls, following up the projection 83 until the forming rolls themselves grasp the end of the plate. As the rolls continue to revolve they will automatically measure off the end margin 67 of the plate, this margin being the peripheral length along the roll between the gage projection 83 and the forming projection 77 (see Fig. 5) and continued revolution of the rolls will force the material of the plate into the groove 80 of the upper forming roll, whereby the corrugations 66 are formed upon the upper surface of the plate. As the end of the plate passes between the forming rolls it will enter the stationary guides $132^1$ and pass between the feed roll $123^1$ and pressure roll 133. During this time the feed roll 123 will continue to revolve. It will therefore be seen that there will be no tendency for the plate to slip between the forming rolls, but, on the contrary, it will be positively pushed between the forming rolls on the one side and positively drawn out from between the rolls on the other side. When the forming rolls have made a complete revolution the throw out clutch 32 will automatically disengage, this disengagement being effected just after the rear end of the plate has passed out of the forming rolls. The feed roll $123^1$ will move the formed plate across the straightening roll $123^2$, and the formed and straightened plate may be conveyed to a trimming machine or otherwise disposed of.

The apparatus is now ready for a second operation, and a new plate 65 may be placed upon the feed roll 123 and the above sequence of operations performed anew.

It should be particularly noted in connection with the operation of our machine that the forming rolls 21, 25 are yieldable, that is, the upper roll is held against the lower roll by the hydraulic pressure cylinders 61. This relieves the apparatus from all undue strains due to uneven thickness of plate and insures a uniform roll pressure which may be nicely adjusted to equal that required for pressing the metal in any desired form. If at any time during the operation of the machine a plate becomes spoiled, wedged, or the machine is otherwise disarranged, the pressure upon the rolls may be instantaneously released from the valves which control the hydraulic pressure in the cylinders 61, and by admitting the pressure fluid to the cylinders 54 the upper roll may be lifted to permit the work to be withdrawn from the machine.

To adapt our machine for various classes of work, the only changes required are the replacement or rearrangement of the annuli which make up the forming surfaces of the rolls 21, 25. In order to effect these changes with the greatest facility, we have adopted the construction of machine shown in which the end frame 19 may be disconnected from the foundation ways 17. When this is done, the frame may be bodily moved outwardly away from the forming rolls, sliding along the ways 17 in such movement. When the frame has been moved beyond the journals 23, 27 of the roll shafts the securing nuts of tie rods 71 may be removed and the annular forming elements may then be slipped off of the rolls and re-arranged or replaced by other forming elements, such as those illustrated by Figs. 6 and 7. When the desired re-arrangement or re-placement of the forming annuli has been effected, the end frame 18 may then be pushed back along the ways 17 until the journals 23, 27 again lie within their bearings.

For the purpose of still further adapting our machine for changes in the classes of work to be handled we prefer to form the individual annular elements of the forming rolls in such a manner that the length of the corrugations made by the rolls may be changed. This may be effected by providing each of the annuli with an inserted portion 150, which may be of such form as to remain firmly locked in place when the annuli are assembled on the roll shafts, one manner of forming the insert to accomplish this result being illustrated by Figs. 4 and 5. The inserts 150 are so located on the surfaces of the annuli as to form the trailing ends or tails of the corrugations. In Figs. 4 and 5 we have illustrated the forming rib 74 and the mating groove 80 as extending through approximately half of the peripheral length of the inserts 150. It will be readily understood that by exchanging these inserts for others having the forming grooves and recesses extending through a greater or less proportion of their peripheral lengths, the lengths of the corrugations 66 formed in the plate may be correspondingly altered, thereby lengthening or shortening the rear margins 67 of the plate or permitting the use of a shorter plate. For effecting a corresponding change in the front margin of the plate the insert $83^1$ which carries the stop plug or gage 83 may be interchanged with other inserts from which the stop plug may occupy various other positions. With this in mind, the mating recess 84 which receives the stop plug 83 may be made of somewhat greater length than the plug, which will permit of the use of inserts having the stop plug or gage in various positions, without the alteration or the dismantling of the upper roll.

In some cases it may be desirable to operate upon hot metal with our machine, and in such operation there will be a tendency for the forming rolls and their bearings to become unduly heated. To overcome this difficulty we may provide for supplying a stream of cooling water to the interior of the hollow roll shafts. Such means is shown in Fig. 1 as consisting of an inlet pipe 160 and an outlet pipe 161.

While we have shown and described in considerable detail one specific embodiment of our invention, it is to be understood that such description is illustrative only and for the purpose of making our invention more clear, and that we do not regard our invention as limited to the particular construction of parts nor to their arrangement as shown and described, except in so far as we have included such limitation within the terms of the following claims, in which it is our intention to claim all novelty inherent in our invention as broadly as possible in view of the prior art.

What we claim as new and desire to secure by Letters Patent, is:

1. A machine for forming metal comprising a frame, a pair of geared roll-shafts mounted in the frame, a plurality of annular members sleeved upon the said roll-shafts and detachably secured thereto, certain of said annular members on one roll-shaft constituting male forming dies and the opposed annular members on the other roll-shaft constituting female forming dies removable elements inserted in the peripheral surfaces of said annuli and constituting portions of the forming surfaces thereof, and a stop on one of said rolls for positioning the metal to be formed.

2. A machine for forming metal from blank stock comprising a head-frame, a tail-frame mounted in ways for movement toward and away from the head-frame, a pair of parallel roll-shafts geared together and mounted in the said head frame, journals for the free ends of said roll-shafts carried by the said tail-frame, fluid-pressure means for urging the journals of one of said roll-shafts toward the other roll-shaft, a plurality of annular members sleeved upon the said roll-shafts and detachably secured thereto, the said annular members constituting the forming surfaces of the rolls, a projection carried by one of said annular members in the forming surface thereof and adapted to serve as a stop to gage the position of the entering metal with relation to the forming members, and feeding means geared to said roll-shafts and operating to urge the entering metal against the said stop and to cause it to follow the same and enter between the rolls when the latter are driven.

CASS L. KENNICOTT.
CHARLES P. KEMBLE.